United States Patent Office 3,557,617
Patented Jan. 26, 1971

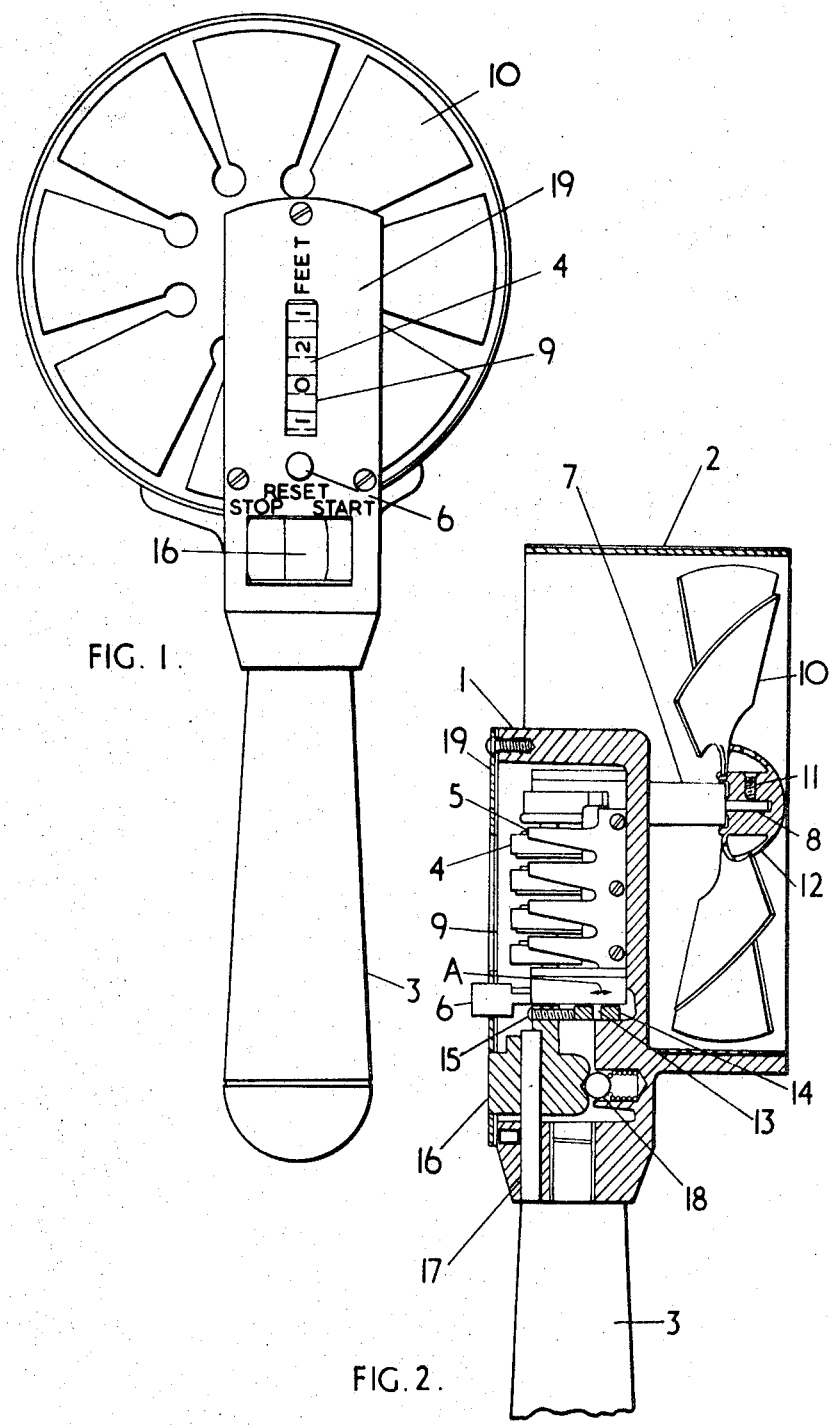

3,557,617
VANE ANEMOMETERS
Alexander Connor Wilson, High Wycombe, Buckinghamshire, and Peter Edward Bagley, Henley-on-Thames, Oxfordshire, England, assignors to Airflow Developments Limited, High Wycombe, England, a British company
Filed June 26, 1968, Ser. No. 740,244
Claims priority, application Great Britain, June 30, 1967, 30,362/67
Int. Cl. G01f 1/02
U.S. Cl. 73—229                4 Claims

ABSTRACT OF THE DISCLOSURE

A vane anemometer intended to be held in an operator's hand and comprising a vaned rotor releasably coupled to a rotary digital drum counter, there preferably being provided means by which the counter can be started, stopped and reset by part of the same hand by which the instrument is held in the air stream of which the velocity is to be measured.

---

This invention relates to instruments for measuring air velocity of the kind known as vane anemometers. The main object of the invention is to provide a simple, reliable and robust means of measuring air velocity at, for example, grilles of air conditioning systems or across large airways in mines or air systems. The instrument is a purely mechanical device requiring no electrical connections or means of power supply.

According to the invention an instrument of the kind referred to and adapted to be held in an operator's hand comprises a vaned rotor releasably coupled to a rotary digital drum counter and is preferably further characterised in that means by which the counter can be started, stopped and reset is operable by part of the same hand by which the instrument is held in the air stream of which the velocity is to be measured.

Whereas the conventional mechanical vane type anemometer incorporates a train of gears driving a series of pointers on small circular dials reading thousands and hundreds of feet within a main dial divided into one hundred parts to read feet, the present invention by incorporating a digital counter presents the same information in a much more readily observed manner. The improved arrangement greatly simplifies the use of the instrument compared with conventional instruments in which the controls are often levers or plungers projecting from the instrument case in a manner unrelated to ergonomic requirements.

One particular and at present preferred instrument or anemometer in accordance with the invention is illustrated in the accompanying drawings wherein FIG. 1 is a front elevation and FIG. 2 is a cross-section in a plane containing the rotor axis and the handle axis of the instrument.

Referring now to the drawings, the instrument shown comprises an aluminium alloy die cast frame 1 to which a handle 3 and a cowling 2 are secured by screws. The frame 1 contains the instrument mechanism which is essentially a drum type counter 4 driven by a worm and wheel incorporating a means for disengaging the drive between the wheel and the drums. It has four drums enabling figures up to 9999 to be recorded. A reset button 6 is fitted to enable all drums to be returned to zero. There is also a braking spring 5 which automatically bears lightly on the edges of the four drums when the drive is disengaged to stop them rotating as they normally tend to do when disengaged. This enables the instrument to be removed from the test position and its reading to be observed at leisure.

The counter 4 has an extended bearing sleeve 7 containing two miniature stainless steel ball bearings and is secured into the frame with the bearing sleeve protruding coaxially of the cowling. A shaft 8 carrying the counter worm at one end passes through the bearings and protrudes from the bearing sleeve and an eight bladed impeller 10 is fitted to this shaft by means of a small grub screw 11. The impeller is pressed from aluminium alloy and it has a hemispherical spinner 12 to minimise air turbulence.

From one end of the counter there protrudes a pin 13 upon which a cam wheel 14 is mounted. The action of moving the pin in the direction shown by the arrows A causes the drive to the counter drums to be disengaged. The movement of the pin is obtained by the pressure of an adjustable screw 14 on the cam wheel. This screw is mounted in an extension of a toggle switch 16 which can assume either of two positions, "stop" or "start." Before a test the switch is put into the "stop" position, that is with the drive disengaged. When the test is begun, the switch is put to the "start" position. This releases the pressure on the cam wheel 14 which allows the pin to return to the drive position assisted by spring pressure. The switch rotates on a steel pin 17 and its two positions are controlled by a ball catch 18. The instrument mechanism is completed by a stainless steel cover 19 which has a window 9 to enable the counter to be read and through which the reset button protrudes.

In normal use the instrument is held up in a current of air, the velocity of which it is required to measure. The toggle switch 16 is put in the "stop" position. When the impeller is rotating, the toggle switch is set to the "start" position at the same time as a stopwatch (or similar timing device) is started. The "start" position sets the counter in motion until the "stop" position is selected at the same time as the timing device is stopped. Usually each measurement of velocity is taken over a period of one minute during which time the average velocity of the air is the number recorded on the counter in units of feet per minute.

In the metric version of the instrument readings are taken in metres over any convenient multiple of 10 seconds to establish velocity in metres per second, the usual metric standard.

We claim:
1. A vane anemometer comprising a vaned rotor supported by a frame having a handle, and a rotary digital drum counter contained within said frame, and wherein there is mounted on said handle; means for resetting said rotary digital drum counter and also a switch element for releasably coupling said rotary digital drum counter to the said vaned rotor.

2. A vane anemometer as claimed in claim 1 wherein a releasable coupling between said rotary digital drum counter and said vaned rotor comprises a pin associated with said rotary digital drum counter and a cam operable by said switch element.

3. A vane anemometer as claimed in claim 1 wherein said switch element forms part of a toggle switch.

4. A vane anemometer as claimed in claim 1 including means for preventing rotation of component drums of said rotary digital drum counter when said rotary digital drum counter is disengaged from the rotor.

References Cited

UNITED STATES PATENTS

| | | | |
|---|---|---|---|
| 2,201,896 | 5/1940 | Granat | 73—187 |
| 2,207,747 | 7/1940 | Manarik et al. | 73—187X |
| 2,514,948 | 7/1950 | Gross | 73—229 |

JERRY W. MYRACLE, Primary Examiner

U.S. Cl. X.R.

73—189